No. 761,415. PATENTED MAY 31, 1904.
H. A. SHERMAN.
AXLE NUT.
APPLICATION FILED NOV. 2, 1903.
NO MODEL.

WITNESSES
Edwin L. Yewell.
Margaret M. Akers.

INVENTOR
Henry A. Sherman
By Davis & Davis
Attorneys

No. 761,415.                                                            Patented May 31, 1904.

UNITED STATES PATENT OFFICE.

HENRY A. SHERMAN, OF FREMONT, OHIO.

AXLE-NUT.

SPECIFICATION forming part of Letters Patent No. 761,415, dated May 31, 1904.

Application filed November 2, 1903. Serial No. 179,525. (No model.)

*To all whom it may concern:*

Figure 1:
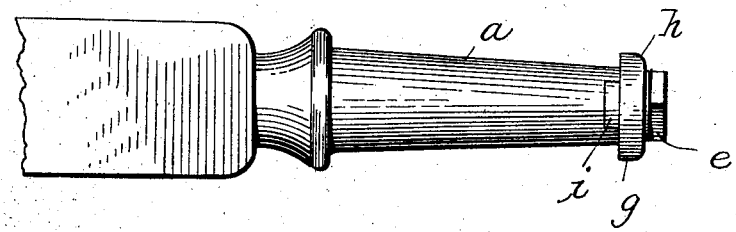
Figure 2:
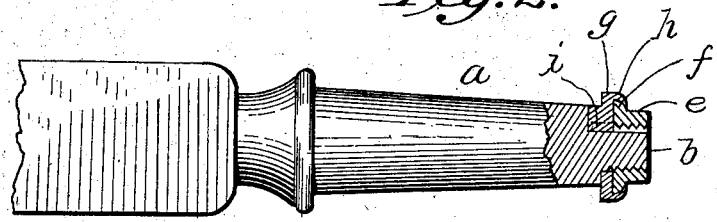
Figure 3:
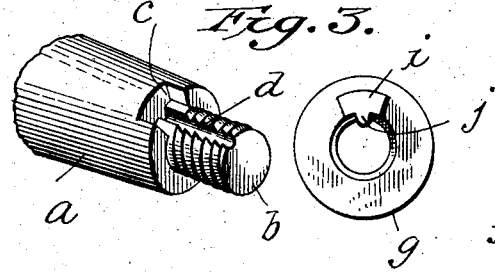
Figure 4:
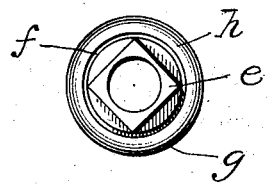

Be it known that I, HENRY A. SHERMAN, a citizen of the United States of America, and a resident of Fremont, county of Sandusky, State of Ohio, have invented certain new and useful Improvements in Axle-Nuts, of which the following is a full, clear, and exact description, reference being had therein to the accompanying drawings, in which—
Figure 1 is a side elevation of an ordinary vehicle-axle provided with my device; Fig. 2, a perspective view partly in section; Fig. 3, a perspective view of the end of the axle-spindle with the nut removed, and Fig. 4 an end view of the nut.

The object of this invention is to provide a simple device for holding the wheel upon the axle in such a manner that the liability of loosening the axle-nut will be obviated, as more fully hereinafter set forth.

In the drawings, $a$ designates the axle-spindle, which is provided at its outer end with the usual reduced threaded portion $b$. In the end of the spindle proper is a segmental notch $c$, which is cut down to a level with the threads on the extension $b$, and formed in the threaded extension $b$ is a guide-groove $d$, which extends centrally into said notch $c$.

The nut $e$ is of the usual form except that at its upper edge it is provided with an annular outward-extending flange $f$, rounded on its outer surface. A washer $g$ is attached rotatively to this nut by a flange $h$, extending outward and downward, so as to loosely clasp the annular flange $f$ on the inner edge of the nut. On the inner face this washer is provided with a segmental lug $i$, which is shaped to nicely fit into the notch $c$ in the end of the spindle. The outer surface of this lug is rounded so as to conform to the periphery of the spindle, and thereby form a portion of its bearing-surface. In the eye of the washer is formed a radial lug or rib $j$, which is located coincident with the center of the lug $i$ and extends inward to the inner end thereof.

It will be observed that the nut is free to rotate independently of the washer and that the washer is prevented from rotating by the engagement of the lug $i$ with the notch $c$. The groove $d$ is simply a guiding-groove serving to properly direct the segmental lug $i$ into the notch $c$, while the notch and lug $i$ take all the strain exerted by the tendency of the wheel to loosen the washer. By thus utilizing the groove in the threaded extension for guiding purposes only and the lug $i$ for locking purposes it will be observed that said grooves may be made so shallow as not to weaken the threaded extension and the lug $i$ and its receiving-notch may be made as large as necessary to take up the strain without weakening the spindle.

Having thus described my invention, what I claim, and desire to secure by Letters Patent, is—

In combination, with an axle-spindle having a threaded extension and a notch formed in the spindle proper adjacent to said extension and a guide-groove in said threaded extension, said guide-groove leading into said notch, and a nut threaded onto said extension and a washer carried by said nut and provided with a radial guiding-rib in its eye or hole and a lug on its inner surface, said guiding-rib being adapted to engage the groove in the threaded extension, and said lug being adapted to fit into the notch in the end of the spindle.

In testimony whereof I hereunto affix my signature, in the presence of two witnesses, this 29th day of October, 1903.

HENRY A. SHERMAN.

Witnesses:
J. M. HALL,
LEO BONER.